United States Patent
Huchin et al.

(10) Patent No.: US 9,796,058 B2
(45) Date of Patent: Oct. 24, 2017

(54) METHOD FOR PRODUCING TURBINE ENGINE PARTS, AND RESULTING MOULD AND BLANK COMPROMISING STACKED PARTS

(71) Applicant: Snecma, Paris (FR)

(72) Inventors: Patrick Emilien Paul Emile Huchin, Moissy-Cramayel (FR); Karine Deschandol, Moissy-Cramayel (FR); Sébastien Digard Brou De Cuissart, Moissy-Cramayel (FR); Serge Fargeas, Moissy-Cramayel (FR); Marc Soisson, Moissy-Cramayel (FR); Anthony Texier, Moissy-Cramayel (FR); Valéry Piaton, Moissy-Cramayel (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 15/106,132

(22) PCT Filed: Dec. 12, 2014

(86) PCT No.: PCT/FR2014/053327
§ 371 (c)(1),
(2) Date: Jun. 17, 2016

(87) PCT Pub. No.: WO2015/092239
PCT Pub. Date: Jun. 25, 2015

(65) Prior Publication Data
US 2016/0318137 A1    Nov. 3, 2016

(30) Foreign Application Priority Data
Dec. 20, 2013 (FR) ...................... 13 63346

(51) Int. Cl.
*B23P 15/02* (2006.01)
*B22D 13/00* (2006.01)

(52) U.S. Cl.
CPC ............. *B23P 15/02* (2013.01); *B22D 13/00* (2013.01)

(58) Field of Classification Search
CPC ................................ B23P 15/02; B22D 13/00
See application file for complete search history.

(56) References Cited

U.S. PATENT DOCUMENTS

| 5,671,533 | A * | 9/1997 | Dillamore | ................ B21J 5/002 29/527.6 |
| 9,221,096 | B2 * | 12/2015 | Foltz, IV | ............... B22D 13/00 |
| 2002/0014006 | A1 * | 2/2002 | Brock | ..................... B23P 15/02 29/889.7 |

(Continued)

FOREIGN PATENT DOCUMENTS

| DE | 102010042585 | * | 4/2012 | ............. B21D 53/78 |
| EP | 2 067 546 A1 | | 6/2009 | |

(Continued)

*Primary Examiner* — Jacob Cigna
(74) *Attorney, Agent, or Firm* — Blank Rome LLP

(57) ABSTRACT

The invention relates to a method for producing multiple metal turbine engine parts, comprising steps consisting in:
a) casting a metal alloy in a mould in order to produce a blank (3); and
b) machining the blank in order to produce the parts, characterized in that the blank obtained by casting is a solid polyhedron with two generally trapezoidal opposing sides (30a, 30b), and the parts are machined in the blank.

8 Claims, 3 Drawing Sheets

(56) References Cited

U.S. PATENT DOCUMENTS

Figure 1:
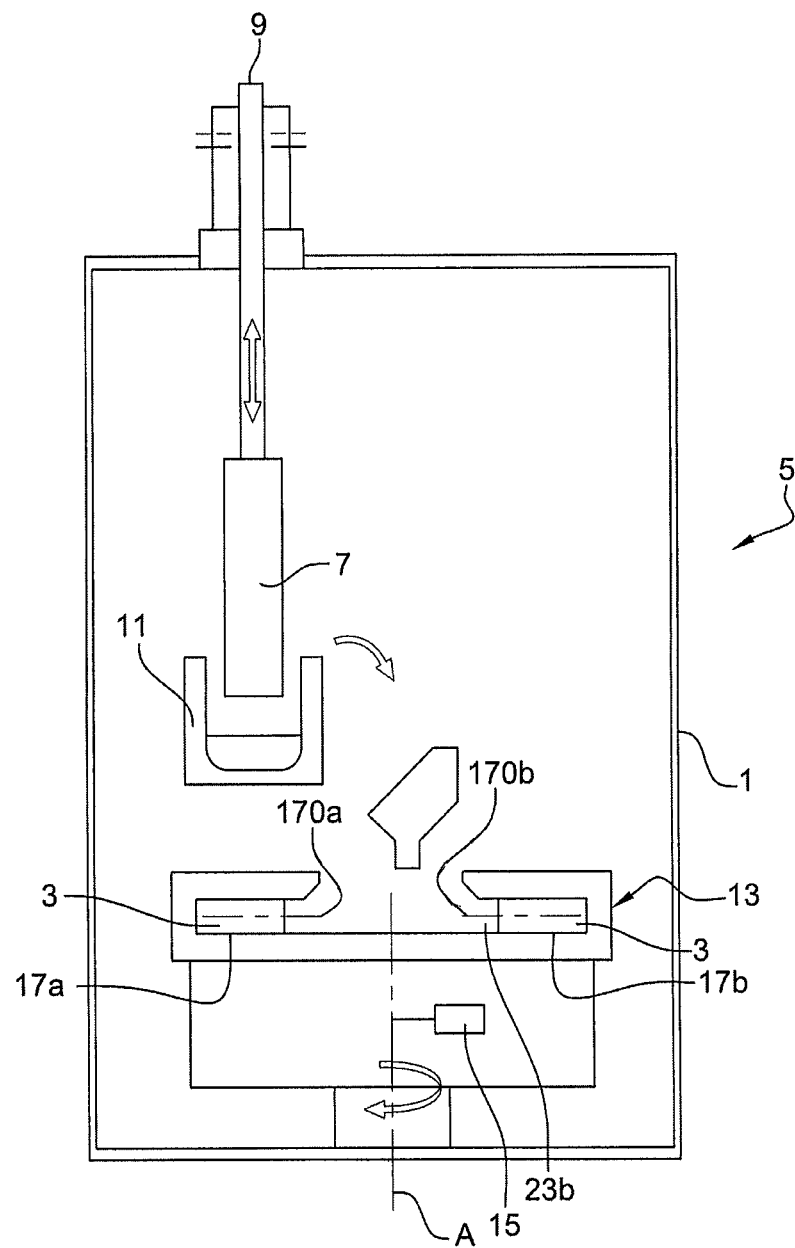

2015/0292339 A1* 10/2015 De Ponnat .............. B23P 15/02
                                                              416/241 R

FOREIGN PATENT DOCUMENTS

| | | |
|---|---|---|
| EP | 2 223 755 A1 | 9/2010 |
| FR | WO 2014072661 A1 * 5/2014 ............. B23P 15/02 |
| GB | 2 290 998 A | 1/1996 |
| JP | 2006-336059 A | 12/2006 |
| JP | 2006336059 A * | 12/2006 |
| WO | WO 2008/125129 A1 | 10/2008 |

* cited by examiner

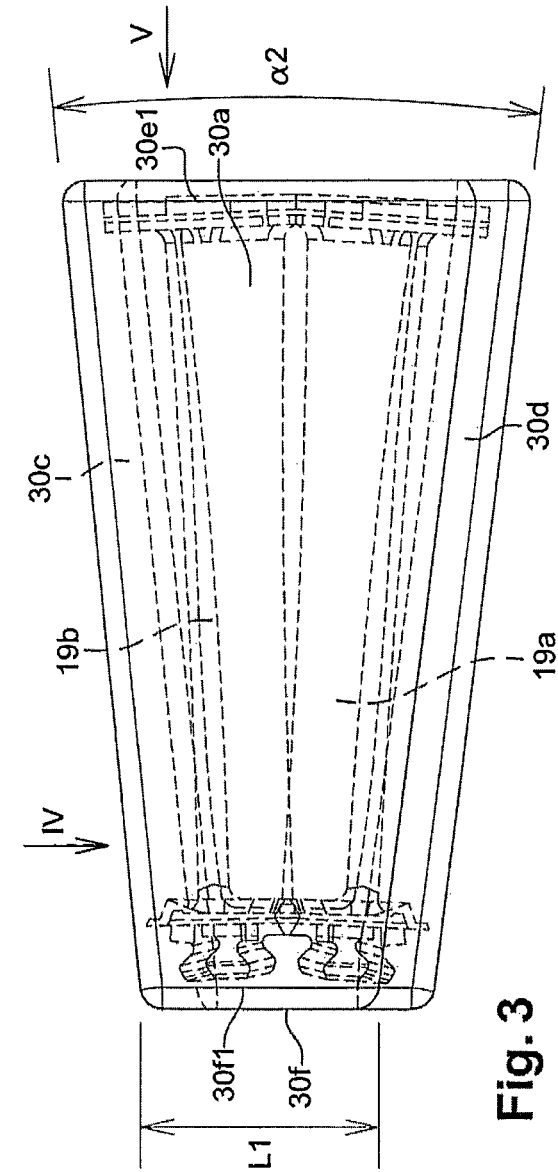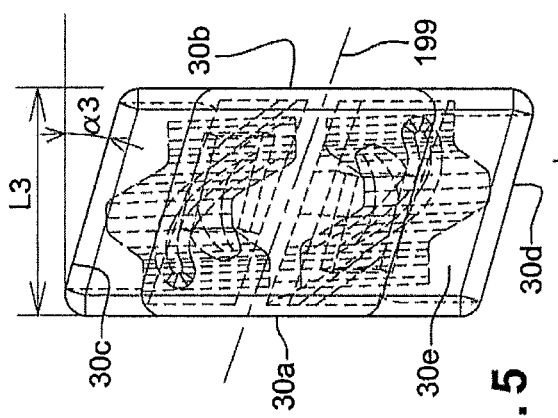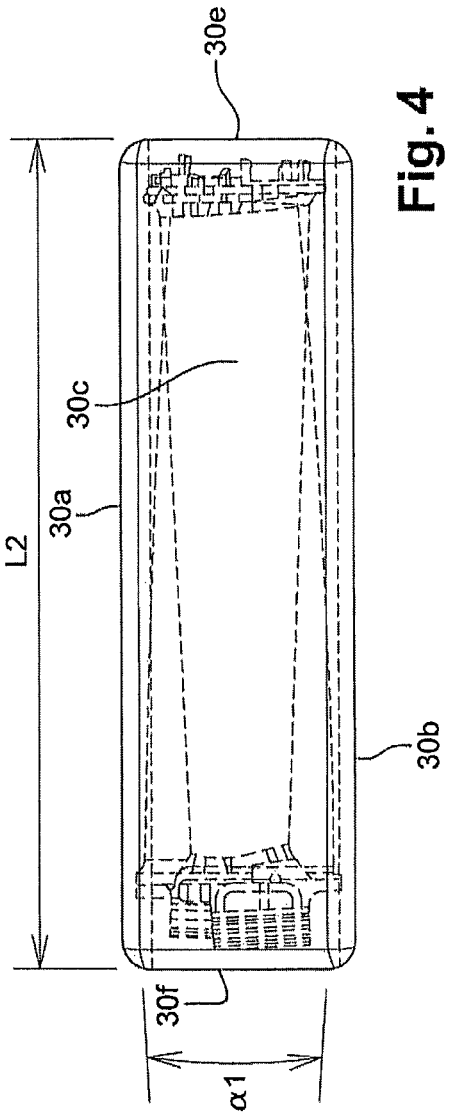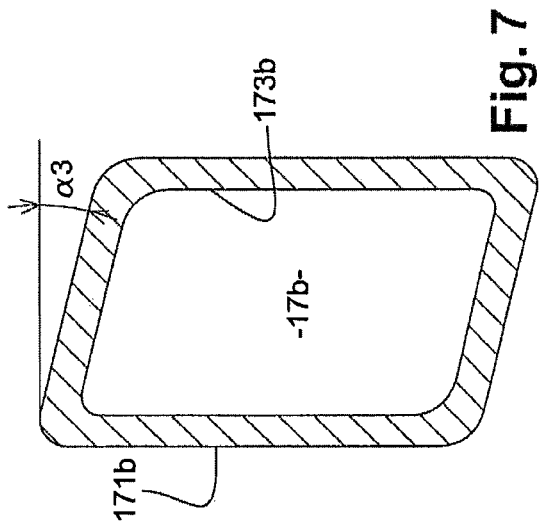

METHOD FOR PRODUCING TURBINE ENGINE PARTS, AND RESULTING MOULD AND BLANK COMPROMISING STACKED PARTS

The present invention relates to a method for producing metal parts for a turbine engine, and more particularly wheel blades for a turbine of a turbojet or a turboprop engine of an aircraft.

To produce several such parts, the following successive steps must be executed:

a) casting a metal alloy in a mould in order to produce a blank, and b) machining the blank in order to produce the parts, Some cylindrical blanks may have different micro-structures as regards their respective centres and their periphery. This may result in different micro-structures within the same blade.

This is specifically the case for parts made from a TiAl-based metal alloy.

In the present technique, some other blanks are obtained by lost-wax foundry using a ceramic mould, wherein the metal alloy is cast. Developing such single-use mould is difficult. Additionally, interactions between the molten metal and the ceramics may result in casting defects on the surfaces of the blanks, and lost-wax may cause geometrical defects in the blanks, if quality is bad.

Besides, machining several parts in a blank raises difficulties in positioning the parts in the blank. The position of such parts must be compatible with the practices of foundry, machining, and those of the field which the parts are intended for.

The present invention makes it possible to remedy at least a part of the above-mentioned drawbacks, in a simple, efficient and economical way.

According to a first definition, the solution provided here consists in the blank obtained by casting being a solid polyhedron with two generally trapezoidal opposing sides, with the parts being machined in the blank. "Trapezoid" as used herein is understood to refer to a quadrilateral with two parallel sides that have different lengths.

To reach the solution provided here, know-how from various areas of competence (foundry, machining) had to be mobilized. The shapes of the blanks and mould cavities resulting therefrom have a pertaining morphology.

As regards the mould used, it is recommended that it comprises at least one polyhedral mould cavity having two opposing sides, each having a general trapezoidal shape, adapted to the moulding of said solid blank.

The mould will preferably be rotating, for the simultaneous moulding of several blanks by centrifugation. The mould will then be connected to means providing rotation about a central rotation axis and will comprise several mould cavities radially extending about said central axis.

Such technology makes it possible to produce TiAL blanks, more particularly for turbine engine blades.

In the field of turbine engines, the method which the mould is intended for can be applied to the moulding of blades, i.e. parts each having a longitudinal axis, and along such axis, a root at one end, a heel at a second end, and a curved section vane which extends there between.

In this application, it is recommended, so that each blank approaches the integration of at least a part of the constraints applied to filling, hardening, stripping, cutting of the blanks and machining of the parts, so that the latter comply with the expected characteristics:

the blank must be adapted to totally contain at least two identical blades, positioned side by side, slightly distant from each other and stacked, said blades must then be machined in the blank, so that one is rotated by 180° relative to the adjacent blade, about the longitudinal axis which then passes through two of the lateral sides of the block, which are, among the lateral sides, preferably those which are perpendicular to the sides having a general trapezoidal shape (within a clearance angle $\alpha 1$ hereunder).

To optimize the moulding, the mould will preferably have an angular opening of the trapezoidal base ranging from 2° to 10°, preferably from 3° to 8°, xN, with N being the number of blades to be machined in the blank.

The mould, which is, for instance a permanent mould wherein the alloy is cast, will preferably be made of metal, which shall make it possible to limit the contamination of the blank material by that of the mould.

As regards the blanks, and in order to optimize the machining of the moulded parts, it is also recommended that:

the substantially trapezoidal base of the blank is placed on two opposing sides having larger surface areas of the blank, and the considered blank has an angular opening of the trapezoidal base ranging from 2° to 10°, preferably from 3° to 8°, xN, with N being the number of blades to be machined in the blank and/or:

the considered blank has a general trapezoid-based prism shape, and/or:

the considered blank has a general oblique prism shape, and/or:

the prism has an opening angle preferably ranging from 0° to 30°, and preferably from 0° to 20°.

Figure 2:
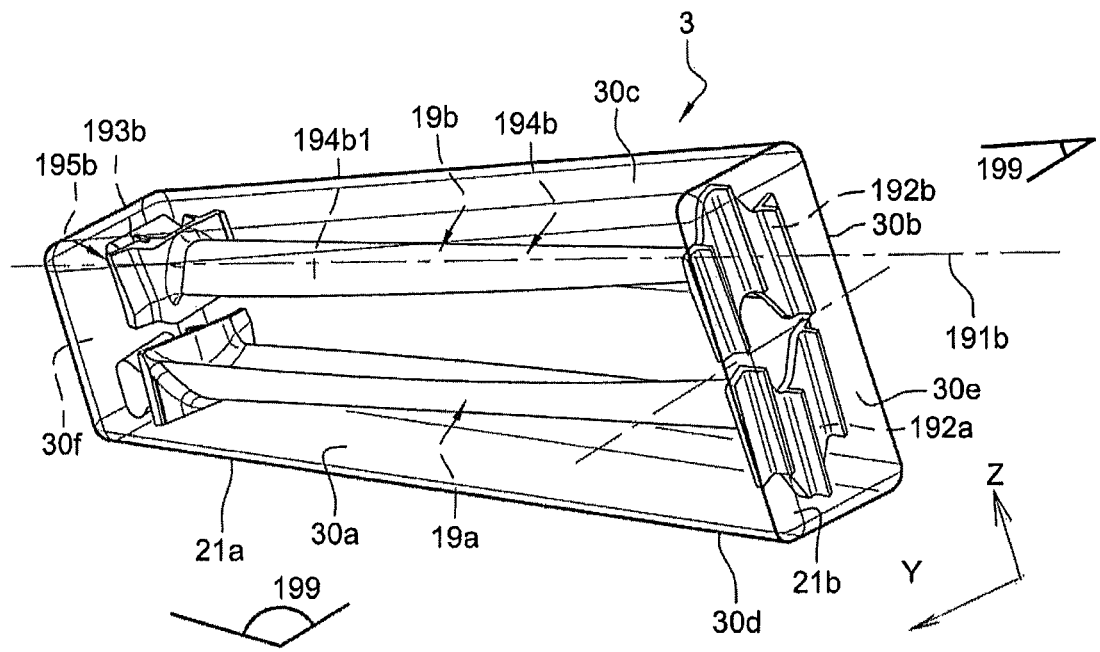
Figure 6:
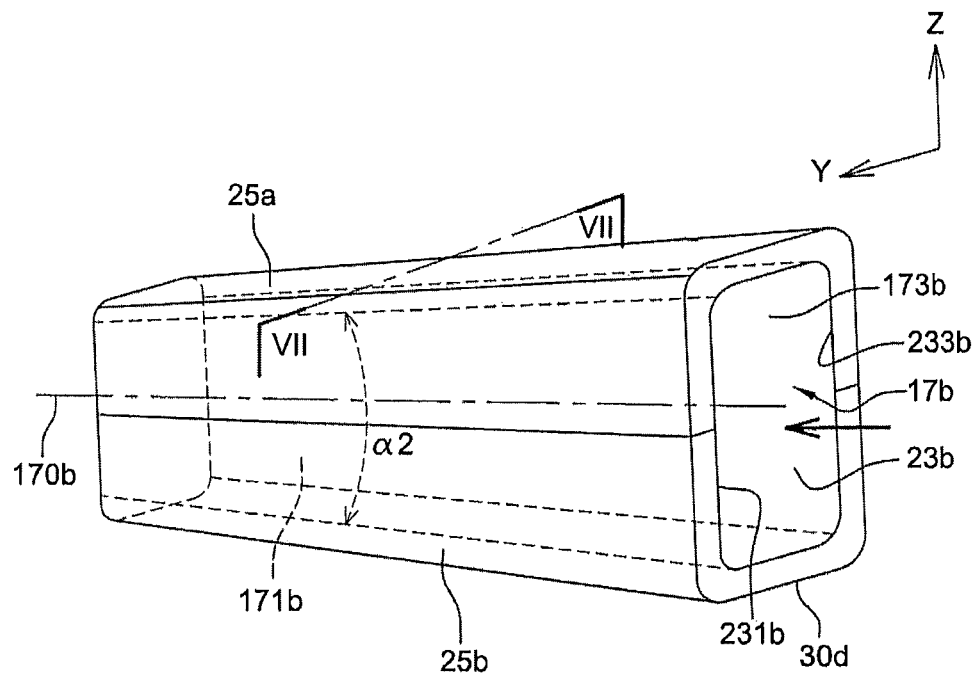

Other characteristics and advantages of the invention will appear upon reading the following description given as a non-restrictive example and while referring to the appended drawings where the FIGS. 3 to 5 have precise dimensions and comply with industrial reality, like dimensioned drawings, wherein:

FIG. 1 schematically shows a device for manufacturing blanks or bars by moulding, FIG. 2 is a schematic view in perspective of a first embodiment of a moulded blank, obtained, for instance, using the moulding device of FIG. 1, FIGS. 3, 4, 5 are views of an alternative moulded blank of FIG. 2, from a first side, from above (IV arrow), and from a second side (V arrow), respectively FIG. 6 schematically shows a part of the mould, with its cavity for moulding the blank of FIG. 2, and FIG. 7 shows the VII-VII section of FIG. 6, for a blank according to the FIGS. 3 to 5.

FIG. 1 thus shows a device 1 for producing blanks or bars 3, while executing successive melting, casting and moulding operations.

The device 1 comprises a closed sealed enclosure 5 whereto a partial vacuum is applied. A TiAl-based metal alloy ingot 7, for example, is fixed at one end of an electrode 9 which is connected to a terminal of a power source, the other terminal of which is connected to a crucible 11 accommodated in the enclosure 5. When the ingot 7 gets closer to the crucible 11, electric arcs are formed between the crucible and the ingot, which causes the melting of the ingot which then falls down to the bottom of the crucible (VSM Vacuum Skull Melting). When melting of the ingot is completed in the crucible, the metal alloy is poured into a preferably metallic and permanent mould 13.

Such mould 13 makes it possible to cast the alloy by centrifugation. For this purpose, the mould is rotated about an axis A using an engine 15.

The mould comprises several recesses or cavities, such as 17a, 17b here, which radially extend about the axis A. The alloy to be cast is brought to the centre of the mould and the rotation of the mould distributes it into the cavities. It is recommended for the cavities to be regularly spaced about such axis.

The axis A will preferably be vertical and the axis (such as 170a, 170b here) in each cavity will be horizontal. In FIG. 1, the mould cavities, such as 17a, 17b, are not shown with the optimized shape(s) thereof, particularly to suit the moulding of a blank 3 complying with that of FIGS. 2 to 5.

The centrifugal forces generated by the rotation of the mould force the molten alloy into such cavities to fill same.

When cooling is completed, the mould 13 is disassembled and the cast parts are extracted.

The shape of the cavities 17a,17b . . . will of course match that of the parts. The following information regarding the parts or the blanks will thus also apply to the cavities in the mould.

It can be seen in FIG. 2, which shows the general shape of a moulded blank complying with the solution provided here, and which may be one of those bearing reference 3 above, that the bar or blank 3 is a solid polyhedron with two generally trapezoidal opposing sides 30a, 30b.

The parts such as 19a,19b, here two turbine engine blades, will be machined at the appropriate moment in such blank, considered in its solid state.

According to a preferred embodiment, the blank 3 has a general trapezoid-based prism shape. It is considered that a prism is a polyhedron with two equal and parallel bases, here 30a and 30b, and the other so-called lateral faces of which are parallelograms.

The blank 3 will be included in such definition, even though:

as probable (considering what it shall a priori be, after casting in a mould), it has rounded angles, such as 21a, 21b, and/or if it has not totally flat, and specifically locally convex, sides (all or part of the bases or lateral sides) to increase the quantity of material about at least one of the parts to be machined, and/or if, as probable, two opposing sides, such as the base sides 30a and 30b, are not parallel by less than 5° of angle (more particularly because of a clearance angle, such as a1 hereunder) and/or not equal as regards the surface by less than 5%.

The blank 3 is an hexahedron. The prism is a right prism. It may be oblique; refer to FIG. 5.

It shall be noted, in all FIGS. 2-5, and more clearly in FIG. 2, that the/each blank 3 has been defined, from the parts to be machined therein, and from the moulding and machining practices, as well as regards the quality of the end parts so that such parts can be machined side by side, at a small distance from each other and stacked. No part shall be imbricated.

Thus, prior to machining the parts, such as 19a,19b, side by side, it will be preferred to cut the blank along a very simple line, such as in a plane 199 (FIG. 2):

passing between two volumes of the blank, each being adapted to totally contain at least one of said parts, and cutting the two opposing sides having larger surface areas 30a, 30b of the blank and two other opposing lateral sides, here 30e, 30f.

The prism configuration has been optimized in FIGS. 3-5; It always has a general trapezoidal shape, and is oblique.

To obtain appropriate filling of the mould and hardening, positioning in the blank, of the parts such as 19a,19b with no imbrication, enabling a simple first cut and an overall volume of such blank so defined as to minimise machining times, it is also recommended, as can be seen in FIGS. 2-5 that said parts should be so machined in the blank that one 19a is rotated by 180° relative to the adjacent blade, such as 19b, about the longitudinal axis thereof, such as 191b for the blade 19b, which then passes through two of the lateral sides of the blank, which are, among the lateral sides, those which are perpendicular to the sides of the base 30a and 30b, within the clearance angle $\alpha 1$, which shall range from 0° to 5°, and preferably from 0° to 3° (refer to FIG. 4).

It shall be noted that the parts such as 19a,19b are slightly distant from each other and stacked. The blank 3 is thus higher (vertical direction Z; FIGS. 2, 6) than thick or wide (direction Y perpendicular to Z)

As clearly shown in FIG. 2, it can be seen that if the parts to be machined are blades, each one (for example the one bearing reference 19b) shall thus have a longitudinal axis 191b and, along this axis, a root 193b adjacent to an internal platform 195b, at a first end, a heel (or external platform) 192b at a second end, and a curved section vane 194b which extends between the platforms. The longitudinal axis 191b may cross the geometrical centre of the root and of the heel.

More particularly, the vanes (such as 194b; FIG. 2) of the blades will additionally be, each, advantageously provided to be machined, with the convex face thereof (such as 194b in FIG. 2) being oriented towards the face 30c, with the opposing concave face then being oriented towards the face 30d, and vice versa for the vane 19a, closest to side 30d.

It can be seen in FIG. 2, that, to be machined <<rotated by 180°>> as indicated, two adjacent blades shall thus preferably be back to back in the moulded blank. The concave side of the vanes will then face each other.

It should also be noted that the heels (or external platforms) 192a,192b are provided to be machined facing, and close to the side 30e, whereas the internal platforms, such as 193b, shall be close to the opposing side 30f.

In FIG. 2 as well as in FIGS. 3-5:

the two (preferably strictly mutually parallel), lateral sides 30e,30f, are thus perpendicular to the two opposing (globally trapezoidal) sides of the base having larger surface areas 30a,30b (within the clearance angle $\alpha 1$), and two opposing edges 30e1,30f1 of each one of such two lateral sides define, in pairs, the two larger bases and the two smaller bases of the opposing trapezoidal sides 30a,30b, respectively.

Besides, it is recommended, for an optimized control of the overall volume, as regards the blades at issue, that an angular opening $\alpha 2$ of the trapezoidal base should be provided, (angle between the sides, 30c, 30d) ranging from 2° to 10°, (and preferably from 3° to 8°, xN, with N being the number of blades to be machined in the blank.

For an optimized machining still, as regards the quality of the end parts and the material used, of several identical blades in the same blank 3, the latter shall preferably have an oblique prism shape, with an opening angle $\alpha 3$ ranging from 0° to 30°, and preferably from 0° to 20°, as in the case of FIGS. 3 and 5. If not null, this angle $\alpha 3$ is thus the angle at which the prism changes from right to oblique.

As specifically shown in FIGS. 2 and 5, such a conformation of the/each blank will enable, relative to the faces surrounding same, the machining of all the (identical) parts at a minimum depth, as regards the constraints imparted by the shape of such parts and the structural characteristics thereof.

If, as preferred, the blanks are cast by centrifugation into a rotating mould, such as mould 13, a shell mould will preferably be used.

As regards now the mould cavities, specifically if this concerns that of FIG. 1, such as for example the one bearing reference 17b, the following is recommended, as illustrated in FIG. 6 where, for simplification purposes, the blank to be moulded is supposed to be that of FIG. 2:

the/each mould cavity, such as 17b, is a polyhedron and has two opposing sides 171b,173b of a generally trapezoidal shape adapted to the moulding of said solid blank, when several blades have to be machined (preferably back to back) in the moulded blank, thus in such a way that one is rotated by 180° relative to the adjacent blade, about the longitudinal axis, the trapezoidal base (face 171b or 173b) then has an angular opening $\alpha 2$ ranging from 2° to 10°, preferably from 3° to 8°, xN, with N being, as mentioned above, the number of blades to be machined in the blank, i.e. side by side along faces 30e,30f, which will then be all the longer (refer to length L1 FIG. 3 of the faces 30c,30d, for the side 300 since many parts are substantially aligned along same.

the opening giving access to the (each) cavity, here bearing reference 23b, is positioned on the trimmed lateral side of such cavity, trimmed opposing sides 231b, 233b of which are the larger bases of the opposing sides 171b,173b of a generally trapezoidal shape, the mould enclosure consists (at least) of two shells 25a, 25b, with each one integrating a part of the concerned mould cavity, here 17b.

In this case, the face 30e of the blank will be moulded at the location of, or opposite the opening 23b and the metal alloy will enter the cavity through the opening 23b (refer to the arrow of FIG. 6), and the moulded, hardened blank 3 could leave it there; a simpler stripping of the blank will however be possible if separable shells 25a, 25b are used.

The bottom of the cavity (and thus of the mould) is solid, opposite the opening 23b.

It can be seen in FIG. 7 that, to obtain the blank of FIGS. 3-5, the concerned mould cavity, such as 17b, will then have a general trapezoid-based prism shape 171b,173b with an opening angle $\alpha 3$ of the prism ranging from 0° to 30°, and preferably from 0° to 20°.

In a particular embodiment, each blank may have a length L2, between the sides 30e, 30f ranging from 160 to 240 cm, and a length L3 between the sides 30a, 30b ranging from 40 to 70 cm.

For two blades, as illustrated in FIGS. 3-5, the length L1, may range from 100 to 140 cm.

It shall be understood from the above that more than two parts could be machined in the same blank 3, specifically more than two identical blades 19a,19b to be machined at substantially the same depth, by extending the length L1 only.

All parts shall have the same volume and the same mass.

The invention claimed is:

1. A method for producing multiple metal turbine engine parts for a turbine engine, comprising:
    a) casting a metal alloy in a mould in order to produce a blank which is a solid polyhedron having faces including two opposite faces, opposite to each other; and
    b) machining the blank in order to produce the parts,
    wherein each of the two opposite faces of the solid polyhedron is trapezoidal,
    wherein said two opposite faces each have a surface area larger than the respective surface areas of any other face of the blank,
    wherein, during the step a), the blank is moulded so that it has a trapezoid-based prism shape, and
    wherein, upon moulding, the blank is moulded:
        with trapezoidal bases thereof corresponding to said two opposite faces having the largest surface areas of the blank, and
        with an angular opening of the trapezoidal bases ranging from 2° to 10°.

2. The method according to claim 1, wherein:
    the blank has faces including said two opposite faces, opposite to each other, and other faces including a first and a second opposite faces, opposite to each other,
    said parts are blades each having a longitudinal axis and, along such axis, a root at a first end, a heel at a second end, and a curved section vane which extends between the first and second ends,
    the blank is adapted to totally contain at least two identical and distant of said parts, located side by side and stacked, and
    said blades are so machined in the blank that one is rotated by 180° relative to the adjacent blade, about the longitudinal axis which then passes through said first and a second opposite faces of the blank.

3. The method according to claim 1, wherein, prior to machining said parts, the blank is cut substantially along a plane of symmetry:
    which passes between two volumes of the blank, each being adapted to totally contain at least one of said parts,
    and which cuts:
        said opposite faces which have the largest surface areas of the blank; and
        two other opposite faces parallel to each other.

4. The method according to claim 1, wherein said faces of the solid polyhedron further include other faces including a first and a second opposite faces that are opposite to each other and each of which is a parallelogram.

5. The method according to claim 1, wherein, during the step a), the blank is moulded so that the trapezoid-based prism shape is oblique.

6. The method according to claim 5, wherein the oblique trapezoid-based prism has an opening angle ranging from more than 0° to 30°.

7. A method for producing multiple metal turbine engine parts for a turbine engine, the method comprising:
    a) casting a metal alloy in a mould in order to produce a blank which is a solid polyhedron having faces including:
        two opposite faces, opposite to each other, and
        other faces; and
    b) machining the blank in order to produce the parts,
    wherein each of the two opposite faces of the solid polyhedron is trapezoidal,
    wherein said other faces include a first opposite parallelogram face and a second opposite parallelogram face that are opposite to each other, and
    wherein said two opposite trapezoidal faces each have a surface area larger than the respective surface areas of said other faces,
    wherein, during the step a), the blank is moulded so that it has a trapezoid-based prism shape, and
    wherein, upon moulding, the blank is moulded:
        with trapezoidal bases thereof corresponding to said two opposite faces of the largest surface areas of the blank, and
        with an angular opening of the trapezoidal bases ranging from 2° to 10°.

8. The method according to claim 7, wherein, prior to machining said parts, the blank is cut along a plane of symmetry:
- which passes between two volumes of the blank, each adapted to totally contain at least one of said parts,
- and which cuts the two opposite faces and said first and second opposite parallelogram faces.

\* \* \* \* \*